July 17, 1934.   E. SCHRENK   1,967,103
WEATHER STRIP DEVICE FOR DOORS
Filed Sept. 8, 1932
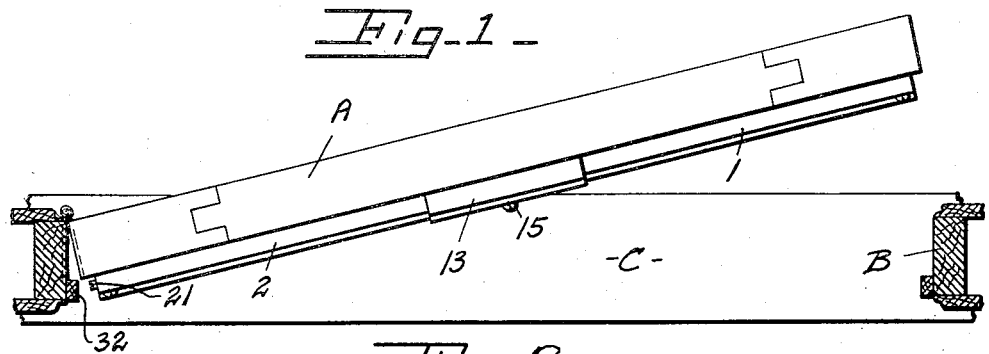
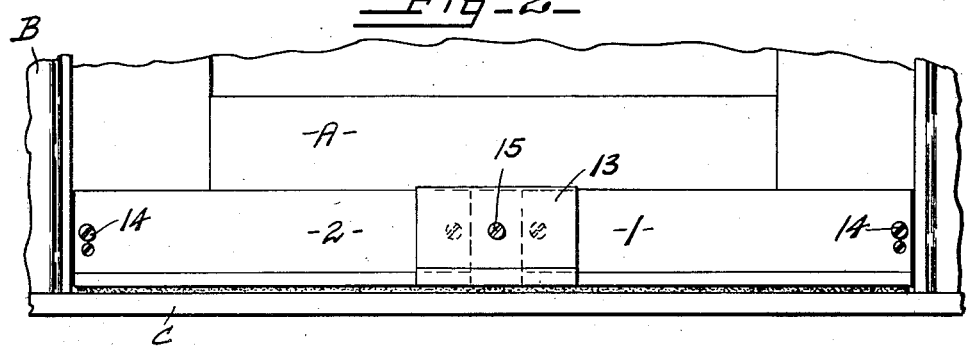
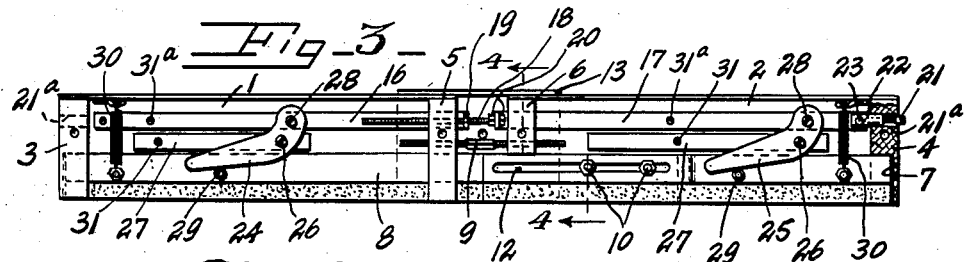
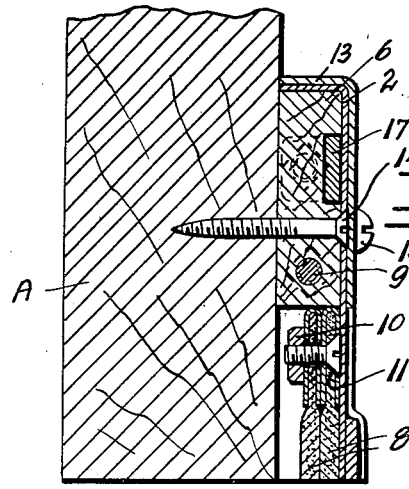
INVENTOR.
Elias Schrenk
BY Bodell & Thompson
ATTORNEYS.

Patented July 17, 1934

1,967,103

UNITED STATES PATENT OFFICE 1,967,103

WEATHER STRIP DEVICE FOR DOORS

Elias Schrenk, Syracuse, N. Y.

Application September 8, 1932, Serial No. 632,205

7 Claims. (Cl. 20—68)

This invention relates to weather strip devices for doors, which devices are applied to the lower edges of the doors to form a weather tight joint when the door is closed, and to lift automatically during the opening of the door, and to move into operative position during closing of the door.

It has for its object, a weather strip device which is readily adjusted to doors of different widths.

It further has for its object a weather strip device in which the mechanism for operating the weather strip member is reversible to adapt the device to doors opening to the right, or to the left.

It further has for its object a particularly simple and efficient operating mechanism for the weather strip member which is adjustable to different widths of doors and to doors opening to the right, or the left, and to doors where the lower edge is not exactly horizontal, or where the crevice between the door and the floor or threshold is wider at one end than the other.

The invention consists in the novel features and in the combinations and constructions hereinafter set forth and claimed.

In describing this invention, reference is had to the accompanying drawing, in which like characters designate corresponding parts in all the views.

Figure 1 is an edge view looking downwardly of a door provided with this weather strip device, the door frame being shown in section.

Figure 2 is a fragmentary elevation of the lower portion of the door provided with my weather strip device.

Figure 3 is an inner face view of this device, partly in section.

Figure 4 is an enlarged, sectional view on line 4—4, Figure 3, the contiguous portion of the door being also shown in section.

This weather strip device for doors comprises generally, a casing including sections adjustable endwise relatively to each other to doors of different widths, a weather strip member slidably mounted in the casing and projecting beyond the lower edge thereof and including sections adjustable endwise relatively to each other, means for actuating the weather strip member during the opening and closing of the door comprising an actuator extending lengthwise of the casing and adjustable endwise to conform to different door widths, and motion transmitting means between the actuator and the weather strip.

A designates the door; B a door frame, and C the floor or threshold.

The casing is in the form of a shallow box open at its rear side and lower edge, and when applied to the door, the open side is toward the door. The casing consists of two sections 1 and 2, having end walls or bars 3, 4, at their outer ends, and inner end walls or bars 5, 6, at their inner ends, these bars 3, 4, 5, and 6, being provided with slots or guides 7 for the weather strip member 8. The sections 1, 2 of the casing are adjustable endwise relatively to each other to conform to different widths of doors, by means of a right and left screw thread connection, as a turn buckle 9, threading at its ends into the bars 5, 6. The weather strip member 8 consists of sections arranged end to end and lapping each other, the sections being held together by means of bolts 10 extending through holes 11 in one section and through slots as 12 in the other section. The space between the sections 1, 2, is covered by a plate 13 wide enough to cover the space in any endwise adjustment of the sections 1, 2, to conform to different widths of the door. The casing is secured to the door by screws 14, or in any other suitable manner, and the plate 13 is secured in position by a screw 15 extending into the door.

The actuating means for the weather strip includes an actuator bar extending lengthwise of the casing, and motion transmitting means between the actuator bar and opposite end portions of the weather strip member 8. The actuator bar is composed of two sections 16 and 17, slidably mounted in the casing, one section of the actuator in each section 1 or 2 of the casing. These bars are arranged in end to end relation and are connected together by a coupling adjustable to extend or shorten the over-all length of the actuator to conform to different widths of the doors. It is also adjustable for another purpose to be hereinafter described.

The coupling connecting the bar sections 16, 17, is here shown as a screw 18 extending axially of the bars and threading at 19 in one of the bars, as 16, and having its other end held from axial movement in both directions by spaced apart heads or collars 20.

One of the bar sections is provided with a pusher 21 at its outer end extending through a passage 21ª in the end wall 3 or 4 beyond the end of the casing in position to coact with the door frame at the hinged edge of the door during the closing of the door. This head or pusher 21 is adjustable endwise in accordance with the movement required of the weather strip 8, and is here shown as a screw extending through the passage 21ª in the end bar 3 or 4 and threading into the bar 16 or 17, or a bracket 22 at the end thereof. The pusher is interchangeably mountable on the outer end of either actuator bar section 16 or 17, and as here shown, the bracket 22 is detachable so as to be mountable upon either the outer end of the bar 16, or the outer end of the bar 17, by means of a screw 23.

The motion transmitting means between the actuator bars 16 and 17 and opposite end portions of the weather strip member 8 as here illustrated comprise angle levers 24, 25, each pivoted at its angle at 26 to the casing, or to a reinforcing bar 27 provided therein, one arm of the angle lever being pivoted at 28 to the actuator bar 16 or 17, and the other arm thereof slidably coacting with a shoulder or pin 29 on each end portion of the weather strip. The weather strip is acted upon by springs 30 at opposite ends thereof which tend to pull the weather strip inwardly into the casing while the levers 24, 25, when actuated, tend to project the weather strip out of the casing against the action of the springs. The motion transmitting means or levers are reversible for right and left doors, and the bars 27 and actuator bar sections 16, 17 are provided with an additional set of holes 31 for the pivots 26 and holes 31ª for the pivots 28.

In applying this device to a door, the sections 1, 2 of the casing and the sections 16, 17 of the actuator bar are adjusted endwise until the casing is the width of the door. This is effected by means of the turn buckle device 9 and the screw 18. The throw, or extent of movement of the weather strip for a wide or narrow crack at the bottom of the door is determined by adjusting the head or pusher 21. If the crack or crevice is not of the same width throughout, but is wider at one end than the other, the initial adjustment of one or the other of the levers 24, 25, can be changed by manipulating the screw device 18, thus changing the initial angle of the lever 25 relative to the lever 24. The weather strip 8 is also adjusted to the proper length by means of the bolts 10 and slot 12. The device is then secured to the door by means of the screws 14 and the plate 13 secured in place by the screws 15.

In operation, when the door is closed, the pusher 21 encounters the door frame, as at 32, pushing in the actuator bar sections 16, 17, thus causing the levers 24, 25, to apply a downward pressure to the weather strip and press it tightly against the floor, or the threshold. When the door is opened, the pressure applied to the head or pusher 21 is released so that the springs 30 are free to react and elevate the weather strip member 8 slightly when the door is opened. When the door is closed, the head or pusher 21 again encounters the door frame, and in so doing causes the levers 24, 25, to press the weather strip snugly against the floor or threshold.

Obviously, by means of the turn buckle device 9 and couping 18, and due to the sectional casing, this device can be readily applied to doors of different widths, and also owing to the device 18 the weather strip can be initially adjusted so as to close crevices that are wider at one end than at the other. Also, by reason of the head or pusher 21 being interchangeably mountable on the outer end of the actuator bar section 16, or 17, and to the reversibility of the levers 24, 25, the device can be readily applied to doors which open to the right, or to the left. In other words, owing to the adjustable features, this weather strip device is readily applicable to doors of different widths and to doors which open to the right, or to the left, and to doors in which the crevice at the bottom is of different width at one end than the other.

What I claim is:

1. A weather strip for doors comprising a casing, a weather strip member slidably mounted in the casing and projecting beyond the lower edge thereof, means for actuating the weather strip during opening and closing of the door including like actuator parts located in the casing, and motion transmitting means between said parts and opposite end portions of the weather strip member, and means for adjusting one of said parts relative to the other for changing the initial position of one motion transmitting part relative to the other, whereby the weather strip is adjustable to compensate for inclinations in the edge of the door.

2. In a weather strip for doors the combination of a casing, a weather strip member slidably mounted in the casing and projecting beyond the lower edge thereof, actuating means for moving the weather strip member into and out of the casing during the opening and closing of the door including sliding actuating bar sections extending lengthwise of the casing and arranged in end to end relation, angle levers pivoted between their ends to the casing having corresponding arms coacting with opposite end portions of the weather strip member, and means for adjusting one of the bars endwise relatively to the other to change the initial angularity of one lever relatively to the other.

3. A weather strip for doors comprising a casing attachable to the door, a weather strip member movably mounted in the casing and projecting beyond the lower edge thereof, means for operating the weather strip member during opening and closing of the door including an actuator in the casing extending lengthwise thereof and having a detachable pusher at one end extending outside the casing into position to coact with the door frame, angle levers pivoted to the casing and pivotally connected at like ends to the actuator at spaced apart points and having their other ends thrusting against opposite end portions of the weather strip member, said levers being reversible and the pusher being interchangeably mountable on either end of the actuator, whereby the actuating mechanism is reversible in the casing and the device adjustable to right and left doors.

4. A weather strip device for doors comprising a casing, a weather strip member slidably mounted in the casing and projecting beyond the lower edge thereof, means for moving the weather strip into and out of the casing during opening and closing of the door including an actuator having a pusher at one end extending outside of the casing in position to coact with the door frame, said pusher being interchangeably mountable on either end of the actuator, and motion transmitting means between the actuator and the weather strip member, said motion transmitting means being reversible.

5. A weather strip device for doors comprising a casing, a weather strip member slidably mounted in the casing and projecting beyond the lower edge thereof, means for moving the weather strip into and out of the casing during opening and closing of the door including an actuator having a pusher at one end extending outside of the casing in position to coact with the door frame, said pusher being interchangeably mountable on either end of the actuator, and motion transmitting means between the actuator and the weather strip member, said motion transmitting means including an angle lever pivoted at its angle to the casing and coacting at its opposite ends respectively with the actuator and the weather strip member, and means whereby the angle lever is reversible relative to the actuator.

6. A weather strip device for doors comprising a casing including a pair of sections, means for securing said sections to the door with the outer ends of the casing adjacent the edges of the door, and the inner ends of the sections in spaced apart relationship, a weather strip member slidably mounted in the casing, and means coacting with the door casing to actuate said weather strip member into engagement with the surface of the floor when the door is closed, means located between the inner spaced apart ends of said sections and operable to adjust the movement of the weather strip, and a plate secured to the door and arranged to overlap the inner ends of the sections and cover said adjusting means.

7. A weather strip device for doors comprising a casing including a pair of sections secured to the door, the outer ends of said sections terminating adjacent the side edges of the door, and their inner ends arranged in spaced apart relationship, a weather strip member slidably mounted in the casing, means carried by the casing for moving the weather strip member into and out of engagement with the floor surface during the opening and closing of the door including an actuator bar carried by each section of the casing, motion transmitting means connecting said bars together, and means located between the inner ends of said sections and operable to adjust one of said bars toward and from the other, a plate secured to the door and arranged to overlap the ends of the sections and forming a cover for said adjusting means.

ELIAS SCHRENK.